June 1, 1965 G. A. KNAPP ETAL 3,187,172
VEHICLE LIGHT
Filed Nov. 23, 1962
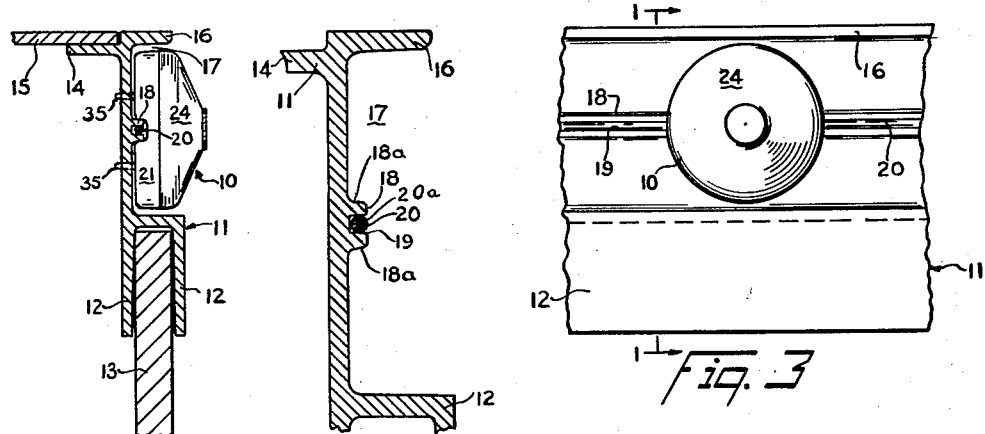
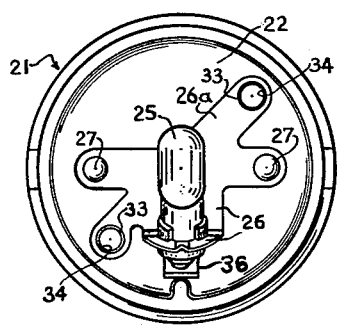
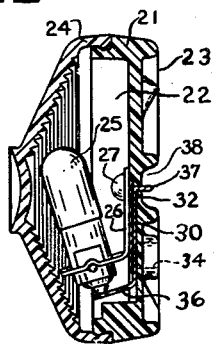
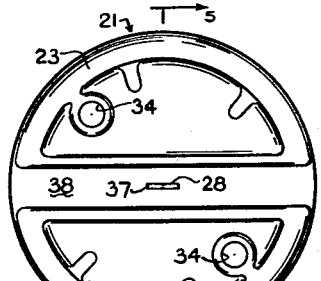
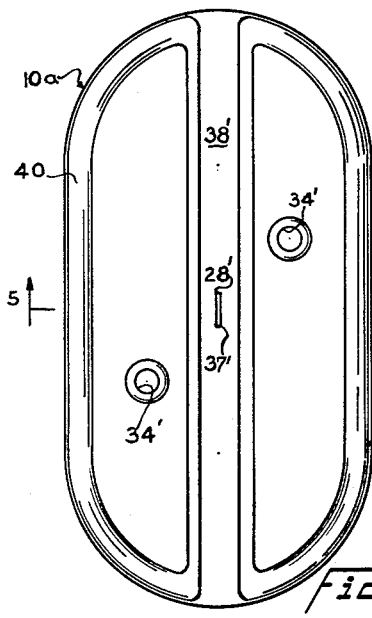
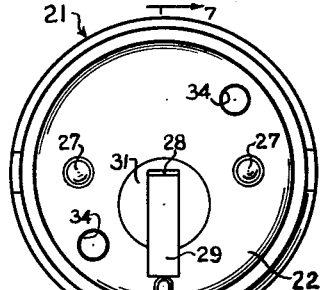
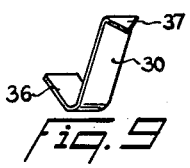
INVENTORS
GEORGE A. KNAPP
AND FRED F. STUBE
BY
Richard von K. Burns
Atty.

3,187,172
VEHICLE LIGHT
George A. Knapp, De Witt, and Fred F. Stube, Syracuse, N.Y., assignors to R. E. Dietz Company, Syracuse, N.Y., a corporation of New York
Filed Nov. 23, 1962, Ser. No. 239,707
2 Claims. (Cl. 240—8.2)

This invention relates to a vehicle light which is readily attachable to a vehicle having exterior wiring for that purpose. More particularly, it relates to a truck marker light which may be quickly secured to a truck or trailer having a longeron, a recessed body member having wiring in an exterior groove in said member.

Large trucks and trailers now require so many marker or clearance lights that it is becoming common practice to provide a horizontally extending member, usually along the top of the vehicle, having a light receiving recess therealong. Such a member is called a longeron and may have an insulated wire lying in an exteriorly opening groove extending along the recess so that a plurality of marker lights may be connected to the wire and secured in the recess at intervals along the longeron.

Conventional screws or rivets are provided for securing the lights to the longeron, but the particular problem has been to provide means for establishing the electrical connection between the exterior wiring and the light both quickly and surely. The present invention provides cooperating means on the longeron and light for aligning the light over the wiring so that a pointed projection or spur on a conductor in the light may be engaged with the wiring with precision. The pointed end of the spur pierces the insulation of the wiring and makes contact with the wire beneath, but the spur is a conductor and must be precisely aligned with the wire to prevent its being deflected and causing a short.

The primary object of the present invention, accordingly, is to provide means for quickly securing and electrically connecting a light to a vehicle having exterior wiring.

Another important object is to provide a longeron adapted for exterior wiring and lights for use therewith, the longeron and lights having cooperating aligning means, and the lights being provided with a metal spur for making electrical contact with the exterior wiring when properly aligned with respect to the longeron.

A further object is to provide a light for use with a longeron having an insulated wire lying in a grooved rib extending therealong, the light having a grooved surface for aligning the light with the rib over the wire and having spur means for making electrical contact with the wire.

Other objects and advantages will become apparent from the following description taken in conjunction with the accompanying drawing, in which:

FIGURE 1 is a cross sectional view of a longeron taken along line 1—1 of FIGURE 3 and showing a light secured thereto according to the invention;

FIG. 2 is an enlarged fragmentary sectional view of a portion of the longeron of FIGURE 1;

FIGURE 3 is a plan view of the longeron and light of FIGURE 1;

FIGURE 4 is an enlarged top plan view of the light with lens removed;

FIGURE 5 is a sectional view thereof on the line 5—5 of FIGURE 6;

FIGURE 6 is a bottom plan view of the light;

FIGURE 7 is a sectional view of the light body on the line 7—7 of FIGURE 8;

FIGURE 8 is a top plan view of the light body with the lamp socket removed;

FIGURE 9 is a perspective view of the electrical contact member of the light; and FIGURE 10 is a bottom plan view of a modified form of lamp according to the invention.

Referring more particularly to FIGURES 1, 2 and 3, a lamp 10 is shown secured to a longeron 11. The longeron, in the present instance, is an extruded aluminum channel member adapted to extend along the top of the front, back and/or sides of a truck or trailer.

Longeron 11 has an inverted U-shaped portion 12 at the bottom for embracing the side members 13 of the vehicle, and an inwardly projecting flange 14 at the top adapted to support and be secured to the roof members 15 of the vehicle. A flange 16 at the top of the longeron is adapted to project outwardly from the vehicle and form, with the portion 12, an outwardly facing channel space or recess 17 extending longitudinally of the longeron for receiving and protecting a plurality of lights 10.

Midway between flange 16 and portion 12, a grooved boss or rib 18 projects outwardly from the longeron and extends the length thereof in the recess 17. A wiring groove 19 in rib 18 contains an insulated multi-strand wire 20, best seen in FIGURE 2. The wire 20 is covered with a soft, rubber-like insulating material 20a, preferably having memory characteristics causing it to close together again over any hole punctured through the insulation. The wire 20 with its soft covering 20a fits tightly in the groove 19 so that it is frictionally held in the groove.

It will be understood that each longeron 11 is grounded in the electrical system of the vehicle, and wire 20 is connected in the system to provide electric current to marker lights secured to the longeron.

The shoulders 18a on either side of the rib 18 are preferably slightly tapered as shown and the depth of groove 19 may be greater or less than the height of the rib, as desired.

Referring now to FIGURES 4, 5 and 6, the light 10 comprises a base or body member 21, having a cupped interior 22 and a longeron-contacting surface or bottom 23, together with a cupped lens member 24. Base 21 and lens 24 are both preferably of molded plastic and the lens is of the snap-on type, lens and base having interlocking rims as shown.

A lamp 25 is removably secured in a single socket member 26 in the interior 22 of the light base. Socket member 26 has a plate portion 26a lying on the floor of the interior 22, and two circular bosses 27 which project up from the light base pass through appropriate holes in the plate portion 26a and are peened over by heating and pressing to secure the socket member 26 to the base.

A narrow slot 28 (FIGURE 6) at the center of the light base 21 extends from the interior 22 to bottom 23, and a rectangular depression or recess 29 (FIGURE 8) extending radially from slot 28 is formed in the floor of the interior 22 for a conductor member 30, best seen in FIGURE 9. Another recess 31 in the floor of interior 22, shown as circular in FIGURE 8, is of less depth than recess 29 and normally contains an insulator pad 32 for separating conductor 30 from the socket member 26 as shown in FIGURE 5.

The plate portion 26a of the socket member is also provided with a pair of holes at 33—33 overlying similar holes at 34—34 through the light base 21. These holes are provided to accommodate means for securing the light to the longeron such as rivets or the screws 35 indicated in FIGURE 1.

The conductor member 30 is provided at one end with a spring contact 36 for carrying electric current to the central terminal of lamp 25, and for biasing the lamp in the socket in the usual manner. The other end of conductor 30 is provided with a pointed spur 37 adapted to project through the slot 28 for making contact with the wire 20 in the longeron.

The bottom surface 23 of the light base 21 is provided with an aligning groove 38 diametrically thereacross and spur 37 projects down into this groove through slot 28 and is aligned along the center of the groove. Groove 38 has substantially the same width as the rib 18 in the longeron and its depth corresponds to the height of the rib so that when the base 21 is placed in the recess 17, with groove and rib aligned, the base fits flat against the longeron with rib 18 closely contained in the groove 38. Spur 37 projects into the groove just far enough to pierce the insulation on wire 20 and penetrate between the strands of the wire to its center for making an electrical contact with the wire.

It will be understood that each longeron is drilled or drilled and tapped, using a conventional jig, at every spot along the longeron where it is contemplated that there will be a light, to provide the holes for the securing means 35, prior to assembling the lights to the longeron.

In operation, a light 10, with lens 24 removed, is placed in recess 17 in approximate position but separated somewhat from the longeron and an awl or other aligning device is used to approximately locate the holes 34 over the corresponding holes drilled or drilled and tapped in the longeron. Alternatively, this alignment may be made by eye. The light base 21 is then pressed inwardly against the longeron, preferably with a slight side to side rocking movement. The groove 38 aligns the base on the rib 18 and the spur 37 of conductor 30 pierces the insulation of wire 20 penetrating between the strands thereof to form the electrical contact.

Screws 35, or other securing means, are then fastened in position and lens 24 is snapped into engagement with base 21 in the usual manner.

It has been found that the securing means themselves, such as screws 35, cannot be used to align the light over the wiring as there is always some clearance between the screws and the holes 34 making it impossible to align base 21 precisely with respect to the groove 19. The alignment provided by the interengagement of groove 38 with the rib 18 is precise in that spur 37 is guided straight downward toward the center of wire 20. Any less precise alignment, it has been found, may allow the spur to strike the wire at an angle or slightly off center so that it may be deflected and cause poor connection or a short circuit.

The light 10 is protected in the recess 17. The interengaged groove 38 and rib 18 shelters the spur 37 and the soft insulation 20a on wire 20 seals around the spur and protects the wire.

A modified form of light 10a is shown in FIGURE 10. The base 40 is elongated but otherwise the same as in light 10, FIGURE 5 being a substantially exact representation of a cross sectional view of the light 10a on the line 5—5 of FIGURE 10.

A groove 38', the cross-sectional configuration of which is the same as that of groove 38 in base 21, extends longitudinally across the bottom surface of base 40 and a spur 37' projects down into the center of the groove and is aligned with the center of the groove. The holes 34' for the means for securing the base to longeron 11 have the same spacing as in base 21, the lamp and socket and conductor members being the same as shown and described in connection with base 21. The lens used with base 40, of course, is similarly elongated to engage with the base at its periphery.

The light 10a is installed in longeron 11 precisely in the same manner as light 10 and lies in recess 17 to provide a larger light than light 10.

As will be apparent to those familiar with the art, the invention may be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

1. In an apparatus including a metallic vehicle body having an elongated groove therein, an elongated insulated cable positioned in said groove, and a plurality of light housings, each housing including a base secured in contact with the vehicle body and overlying said groove, each base having a pair of bulb terminals, said terminals being insulated from one another, each housing having electrically conductive means in contact with the vehicle body and connected to one terminal for making a ground contact for the bulb, the other terminal being connected to a sharp electrically conductive spur projecting from said base, said spur piercing the insulation of said cable to complete the electrical circuit for the bulb; the improvement comprising: said vehicle body having an elongated projecting rib on either side of said elongated groove, and each of said light bases having therein an aligning groove that receives said ribs with a close fit, said sharp conductive spur being disposed in the center of said aligning groove so that it is precisely aligned with the center of the cable when each light base in secured to the vehicle body.

2. In the combination of a metallic vehicle body having an elongated insulated cable mounted thereon, a source of power being connected at one side to the vehicle body and at the other side to the cable; and a plurality of marker lights, each light having an insulative base secured to the vehicle body, each light having a pair of bulb terminals, each base having electrically conductive means connecting one of said terminals to the vehicle body, each light having a sharp electrically conductive spur connected to the other of said terminals and projecting through said base for piercing the insulation of said cable; the improvement comprising: an elongated outwardly projecting, shouldered aligning rib on the cargo body on each side of and in contact with the insulated cable, and a cooperating elongated aligning groove in each lamp base overlying said ribs, said groove having shoulders engaging said rib shoulders, said projecting spur being disposed in said groove so that it passes midway between said ribs into the center of the cable when each light base is mounted on the vehicle body.

References Cited by the Examiner
UNITED STATES PATENTS

| | | | |
|---|---|---|---|
| 1,909,412 | 5/33 | Ludwig | 339—99 |
| 2,985,750 | 5/61 | Ritz-Woller et al. | 240—7.1 |
| 3,049,613 | 8/62 | Baldwin | 240—7.1 |
| 3,087,051 | 4/63 | Black | 240—7.1 |

NORTON ANSHER, *Primary Examiner.*